Oct. 2, 1928.  1,686,470
D. SCHWERTNER
HUMIDIFYING DEVICE FOR INTERNAL COMBUSTION ENGINES
Filed Nov. 17, 1924
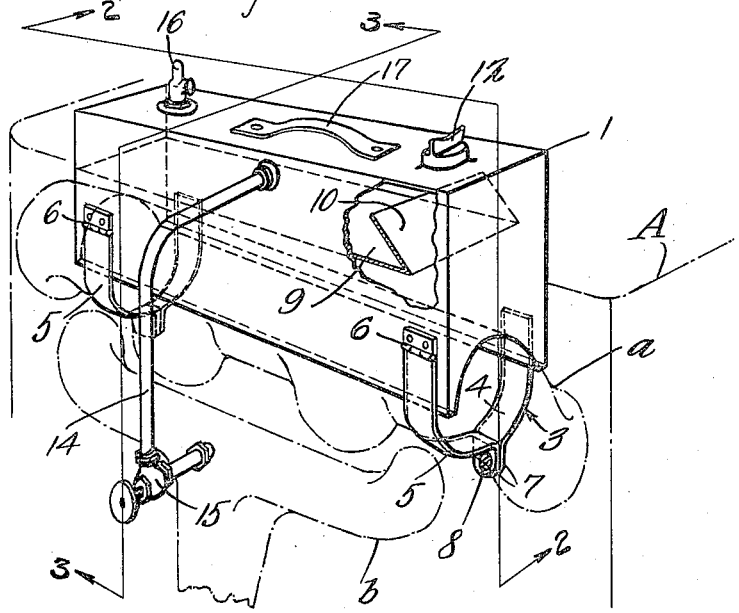
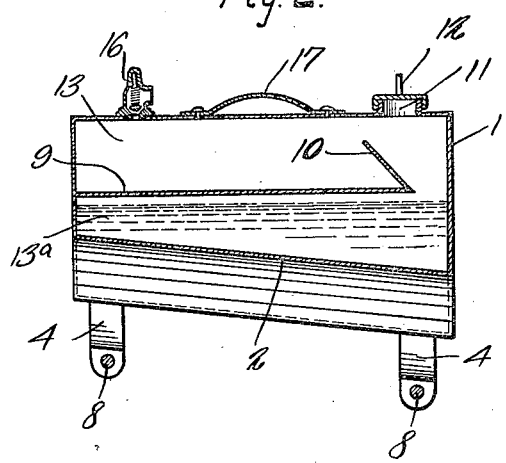
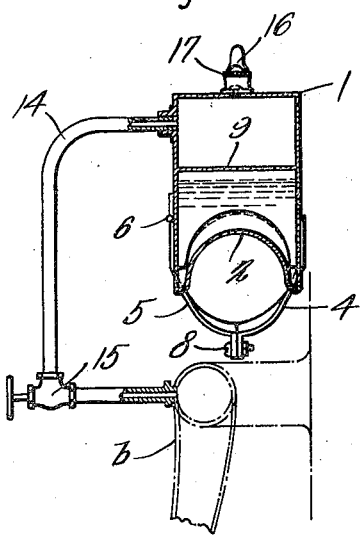
DAVID SCHWERTNER, INVENTOR
BY Victor J. Evans
ATTORNEY Patented Oct. 2, 1928.

1,686,470

UNITED STATES PATENT OFFICE.

DAVID SCHWERTNER, OF LEIPSIC, OHIO.

HUMIDIFYING DEVICE FOR INTERNAL-COMBUSTION ENGINES.

Application filed November 17, 1924. Serial No. 750,404.

This invention relates to appliances for internal combustion engines, and more particularly to what I term a humidifying device for internal combustion engines.

One of the main objects of the invention is to provide simple and efficient means which can be readily applied to an internal combustion engine and will generate steam in such manner as to supply the same to the intake manifold so as to provide a moist explosive mixture. A further object is to provide a device of this character which can be applied to the exhaust manifold of the engine in such manner as to utilize the heat generated in the exhaust manifold for heating water to generate steam to be used in the cylinders. Further objects will appear from the detail description.

In the drawings:—

Fig. 1 is a perspective view of the device indicating its use;

Fig. 2 is a section taken substantially on line 2—2 of Fig. 1;

Fig. 3 is a section taken substantially on line 3—3 of Fig. 1.

The device includes a sheet metal tank 1 provided with a concaved bottom wall 2 which is inclined from one end of the casing and is adapted to fit about the upper portion of exhaust manifold $a$ of an internal combustion engine A. At each end tank 1 is provided with a depending clamp 3 which includes an inner section 4 secured to the tank and an outer section 5 hinged at 6 to the tank, each of these sections being provided at its lower end with an offset tab 7 and these tabs having registering openings for receiving a securing screw 8. This provides simple and efficient means whereby the tank is effectually secured upon the exhaust manifold so as to fit about the upper portion thereof.

A baffle plate 9 extends across tank 1 at approximately the vertical center thereof and terminates a short distance from one end of the tank, this baffle plate being provided with a flange 10 which is inclined downwardly toward the adjacent end wall of the tank. The tank is provided, through its top wall with a filling neck 11 which is exteriorly threaded for reception of a closure cap 12. Water poured through neck 11 will be directed by flange 10 into the water space below baffle plate 9. Space 13 above the baffle plate is a steam space in which steam generated in the tank collects this steam being conducted to the intake manifold $b$ by means of a tube 14 which communicates at its upper end with space 13 adjacent the top wall of tank 1, this tube being provided at its lower end with a valve 15 of known construction the outlet end of which projects into intake manifold $b$. The tank is further provided with a release safety valve 16 of a known construction and with a handle 17 for convenience in placing the tank in position and removing it from the manifold.

When the tank is applied and the proper amount of water has been poured into water space $13^a$ the engine being in operation, the heat from exhaust manifold $a$ will be absorbed by the water and will quickly raise the water to boiling temperature so as to generate steam which will collect within the steam space 13 from which it is discharged into intake manifold $b$ by means of tube 14 and valve 15, this steam acting to produce an explosive mixture containing a suitable proportion of water in vaporous form which will act to increase the expansive efficiency of the explosive mixture and will also prevent, to a great extent, the forming of carbon in the engine cylinders. As this device utilizes the heat generated in the exhaust manifold for heating the water there is no expense attached to its operation and the device itself can be easily produced and applied at small cost, thus providing a device of simple and inexpensive construction which can be readily applied and will act to materially increase the efficiency of operation of the engine to which it is applied.

What I claim is:—

In a humidifying device for an internal combustion engine, a tank adapted for seating upon the exhaust manifold of the engine, a baffle extending across the tank from one end thereof to within a short distance of the other end of the tank and dividing the interior of said tank into a lower water compartment and an upper steam space, said baffle being provided at its inner end with a flange extending above the baffle and inclined downward toward the adjacent end of the tank, the tank being provided with a filling neck above the flange, said flange acting to direct into the water compartment water poured through said neck and to prevent water from said compartment from splashing onto the upper surface of the baffle, an outlet tube connecting with the steam space of the tank, and means for controlling discharge of steam from said tube.

In testimony whereof I affix my signature.

DAVID SCHWERTNER.